United States Patent
Shiono et al.

(10) Patent No.: US 6,347,893 B1
(45) Date of Patent: Feb. 19, 2002

(54) CAMERA HAVING A BARRIER CAPABLE OF SINGLE SMOOTH OPERATION

(75) Inventors: Junji Shiono, Yokohama; Tatsuya Suzuki; Moriya Katagiri, both of Tokyo, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/377,267

(22) Filed: Aug. 19, 1999

(30) Foreign Application Priority Data

Sep. 1, 1998 (JP) .......................................... 10-247382

(51) Int. Cl.$^7$ ............................................. G03B 17/00
(52) U.S. Cl. ....................................................... 396/448
(58) Field of Search ................................ 396/448, 535, 396/439

(56) References Cited

U.S. PATENT DOCUMENTS

| 4,557,574 A | * | 12/1985 | Kohno et al. ................ 354/288 |
| 5,740,480 A | * | 4/1998 | Kuhn, Jr. et al. ............ 396/177 |
| 5,765,066 A | * | 6/1998 | Balling et al. ............... 396/411 |
| 6,151,455 A | * | 11/2000 | Mikami et al. .............. 396/205 |

FOREIGN PATENT DOCUMENTS

| JP | 58-163938 | 11/1983 |
| JP | 10-170988 | 6/1998 |

* cited by examiner

Primary Examiner—Christopher E. Mahoney
(74) Attorney, Agent, or Firm—Frishauf, Holtz, Goodman, Langer & Chick, P.C.

(57) ABSTRACT

A camera body includes a photographing lens. A barrier is supported on the camera body so as to be movable between a cover position covering the photographing lens and a retreat position retreated from the cover position in a first direction substantially parallel to an optical axis of the photographing lens and a second direction substantially perpendicular to the first direction. A rail mechanism is provided to guide relative movement between the camera body and the barrier in the first and the second directions of the barrier. The rail mechanism comprises a first slide projection, a second slide projection, a first cam portion and a second cam portion. The first slide projection has a predetermined projecting length and guides movement of the barrier. The second slide projection has a projecting length longer than the first slide projection and guides movement of the barrier. The first cam portion is slidably engaged with the first and the second slide projections and guides movement of the barrier in the second direction. The second cam portion, branched from the first cam means and slidably engaged with only the first slide projection, guides movement of the barrier in the first direction.

12 Claims, 5 Drawing Sheets

CAMERA HAVING A BARRIER CAPABLE OF SINGLE SMOOTH OPERATION

BACKGROUND OF THE INVENTION

The present invention relates to a camera, and particularly to a camera having a barrier movable along a rail mechanism between a position over a photographing lens and a position retreated from the photographing lens.

A compact camera having a barrier movable along a rail mechanism has been conventionally known. The purpose of the barrier is to protect the optical system, such as the photographing lens and the finder, when the camera is carried, and to cover the projecting portion to make the camera compact.

A number of camera makers have proposed a type of camera which has a barrier capable of simply moving linearly along a rail, a so-called "full barrier".

Further, a camera having a barrier, called "a flat barrier", is known as a more compact camera. The barrier of this type is movable along a rail mechanism also in a direction substantially parallel to the optical axis of the photographing lens, so that the front surface of the camera is flat when the barrier is closed.

For example, Jpn. UM Appln. KOKAI Publication No. 58-163938 discloses a camera which achieves the aforementioned objects by means of a barrier movable along a rail mechanism not only in the horizontal direction but also in the direction substantially parallel to the optical axis of the photographing lens.

The conventional camera of this type has a structure in which a barrier rail branches in the horizontal direction in front of the camera. While the barrier is traveling, a plurality of pins (claws) of the barrier are slid along the rail.

With the barrier rail having the basic structure described above, however, when the user is to manually slide the barrier, a pin of the barrier may be removed from a predetermined route of the rail while sliding, particularly, at a branch point of the rail. Otherwise, the pin may erroneously enter into another route. Thus, the barrier is easily caught in the rail.

In this state, even if the user simply continues the manual operation, the barrier cannot be moved successfully.

In this case, the user must first remove the barrier from the caught position by, for example, returning the barrier in the opposite direction, and then try to move it in the forward direction.

The conventional camera as described above has a problem in operation that the barrier cannot be moved successfully in only a single smooth operation.

BRIEF SUMMARY OF THE INVENTION

The present invention has been made to overcome the problem of the conventional art as described above, and an object of the present invention is to provide a camera having a compact and simple rail mechanism which can realize a successful barrier slide operation by a single smooth operation.

To achieve the above object, according to a first embodiment of the present invention, there is provided a camera comprising:

a camera body including a photographing lens;

a barrier supported on the camera body so as to be movable between a cover position covering the photographing lens and a retreat position retreated from the cover position in a first direction substantially parallel to an optical axis of the photographing lens and a second direction substantially perpendicular to the first direction; and a rail mechanism for guiding relative movement between the camera body and the barrier in the first and the second directions of the barrier, the rail mechanism comprising:

a first slide projection having a predetermined projecting length for guiding movement of the barrier;

a second slide projection, having a projecting length longer than the first slide projection, for guiding movement of the barrier;

first cam means, slidably engaged with the first and the second slide projections, for guiding movement of the barrier in the second direction; and second cam means, branched from the first cam means and slidably engaged with only the first slide projection, for guiding movement of the barrier in the first direction.

According to another embodiment of the present invention, there is provided a camera comprising:

a camera body including a photographing lens and a rail formed of a shallow groove and a deep groove connected to each other;

a barrier supported on the camera body so as to be movable along the rail between a cover position covering the photographing lens and a retreat position retreated from the cover position;

a long projection provided on the barrier so as to be slidable along the rail and engageable with only the deep groove;

a short projection provided on the barrier so as to be engageable with both the deep groove and the shallow groove; and urging means, elastically deformed when one of both ends of the barrier along a direction of movement of the barrier is brought into contact with the camera body, for urging the barrier so that the short projection can be inserted and removed from the shallow groove.

According to still another embodiment of the present invention, there is provided a camera comprising:

a camera body including a photographing lens;

a barrier supported on the camera body so as to be movable between a cover position covering the photographing lens and a retreat position retreated from the cover position in a first direction substantially parallel to an optical axis of the photographing lens and a second direction substantially perpendicular to the first direction;

a first slide projection having a short length formed on the barrier;

a second slide projection having a long length formed on the barrier; and a rail for guiding movement of the barrier, the rail comprising:

a common rail portion formed in the camera body, engaged in common with the first and the second slide projections, when the barrier is moved;

a first rail portion branched from a middle portion of the common rail portion and engaged with only the first slide projection; and a second rail portion continuous to the common rail portion in a region where only the second slide projection can move, and engaged with the second slide projection.

According to a further embodiment of the present invention, there is provided a camera comprising:

a camera body including a photographing lens;

a movable barrier movable between a first position covering a front of the photographing lens, where the movable barrier and a front surface of the camera body are substantially on a same plane, and a second position retreated from the front of the photographing lens and projected from the front surface of the camera body to expose the photographing lens;

a long pin and a short pin, arranged in line with an axis of movement of the movable barrier and crossing an optical axis of the photographing lens, the long pin being closer to the photographing lens than the short pin;

a first cam groove, engaged with the long pin and bent so that the movable barrier comes closer to the photographing lens via the long pin, when the movable barrier moves from the second position to the first position;

a contact portion brought into contact with a distal end portion of the movable barrier when the movable barrier approaches the first position along the first cam groove;

a second cam groove, shallower than the first cam groove and branched from the first cam groove, for guiding the short pin together with the long pin engaged with the first cam groove, so that the movable barrier can be positioned at the first position.

According to a still further embodiment of the present invention, there is provided a camera comprising:

a camera body including a photographing lens;

a movable barrier movable between a first position covering a front of the photographing lens, where the movable barrier and a front surface of the camera body form a substantially flat surface, and a second position retreated from the front of the photographing lens and projected from the front surface of the camera body to expose the photographing lens;

a guide surface for guiding side surfaces of the movable barrier;

a cam groove bent so that the movable barrier is movable with respect to the guide surface between the first position and the second position;

a long pin and a short pin, engaged with the cam groove and arranged in line with an axis of movement of the movable barrier, the long pin being closer to the photographing lens in the axis of movement of the movable barrier; and a contact portion brought into contact with a distal end portion of the movable barrier when the movable barrier moves from the second position to the first position;

wherein the cam groove comprises:

a first groove portion engaged with the long pin, when the movable barrier moves from the second position to the first position; and a second groove portion, having a depth smaller than a length of the long pin and branched from the first groove portion, provided to be engaged with the short pin when the movable barrier is brought into contact with the contact portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference characters designate like or corresponding parts throughout the several drawings.

First Embodiment

Figure 1:
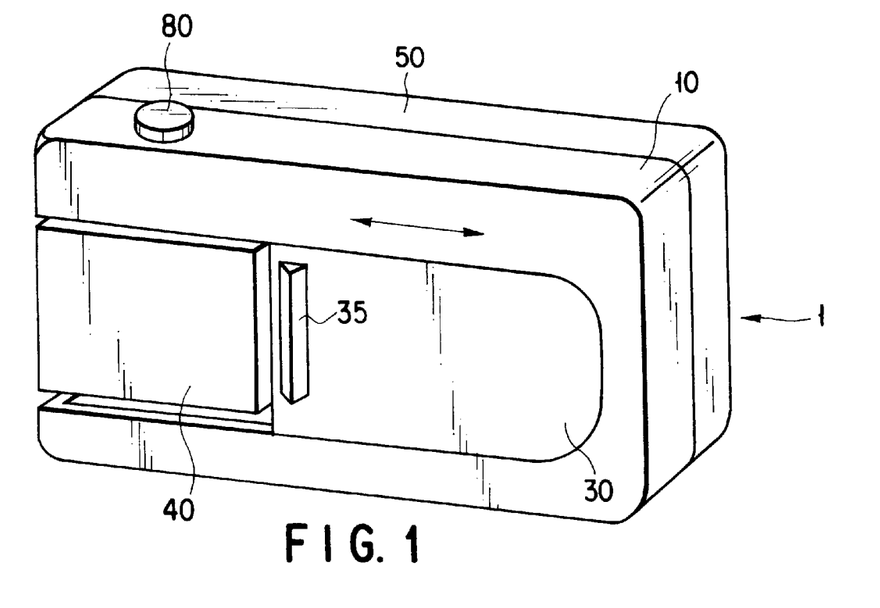
FIG. 1 is a perspective view of a camera according to a first embodiment of the present invention in which the barrier is closed.

FIG. 1 is a perspective view of a camera according to a first embodiment of the present invention.

FIG. 1 shows a closed state of a barrier 30 seen obliquely from above the camera.

The camera has a wall member called "a flat barrier" slidably mounted on a front cover so as to be closed when the camera is not used. This barrier structure covers a main optical system of the camera, thereby forming a flat front surface which is safe and convenient to carry.

The camera comprises a front cover 10, a barrier 30, a barrier ornament 35, a cover 40, a rear cover 50 and a shutter button 80. The front cover 10 covers a camera body 1 from the front. The barrier 30 is attached to the front surface of the camera body 1 so as to be movable in the directions indicated by the arrows, to shield an optical system such as a photographing lens 60 mounted on the camera body 1. The barrier ornament 35 is attached to an end portion of the front surface of the barrier 30 along the vertical direction and projected forward, so that the user can slide the barrier 30 in the directions of the arrows by a finger. The cover 40 covers the front of, for example, a region held by the right hand of the user. The rear cover 50 covers the overall main portion of the camera from the side opposite to the front cover 10.

The shutter button 80 slightly projects upward above a right portion of the upper surface of the front cover 10.

It is understood from FIG. 1 that, when the barrier 30 is closed, a front surface of the front cover 10 having a 90°-turned U shape, the cover 40 and the barrier 30 form a flat surface of the same level, as described above.

Figure 2:
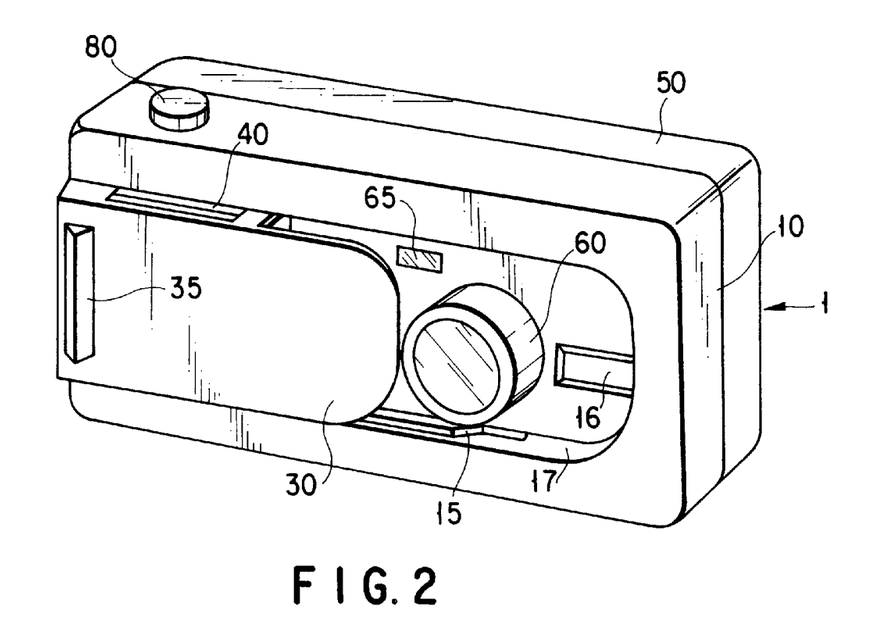
FIG. 2 is a perspective view of a camera according to the first embodiment in which the barrier is opened.

FIG. 2 is a perspective view of a camera according to the first embodiment in the case where the barrier 30 shown in FIG. 1 is opened.

When the barrier is slid by pressing the barrier ornament 35 leftward in the drawing, a power supply (not shown) is turned on in association with the slide movement, thereby supplying power to the camera body 1. As a result, as shown in FIG. 2, a lens barrel of the photographing lens 60 hidden behind the barrier 30 projects forward along the optical axis and a finder 65 is exposed.

At this time, the barrier 30 is slid along barrier pin traveling grooves 15, which are provided in upper and lower interior edge portions 17 of the front cover 10. Each of the upper and lower barrier pin traveling grooves 15 has a predetermined form and predetermined two levels of depth.

Figure 3:
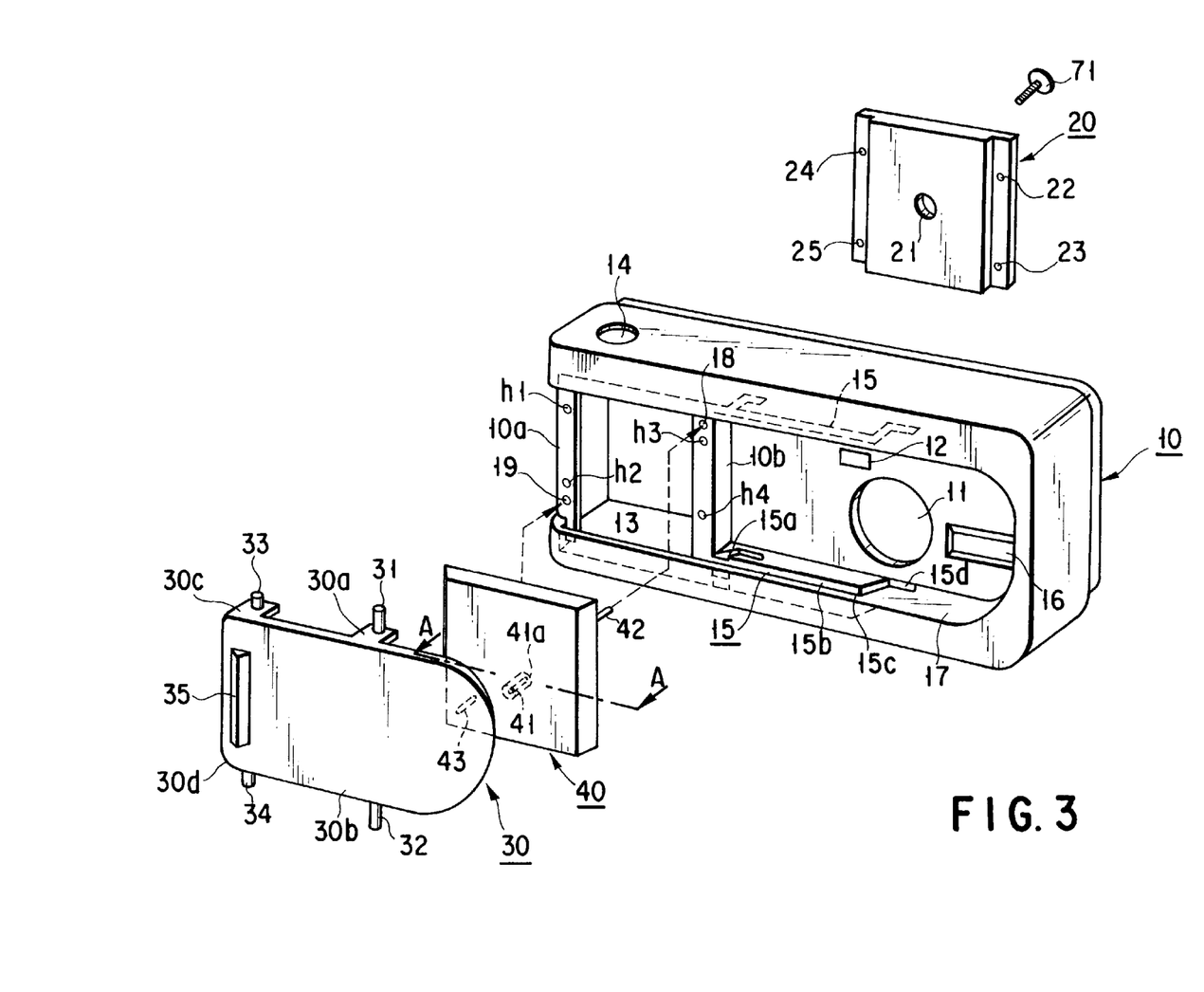
FIG. 3 is an exploded perspective view of a camera according to the first embodiment.

A plurality of pins 31, 32, 33 and 34 are projected from inner portions of the barrier 30 (see FIG. 3). These pins are inserted in and travel along the barrier pin traveling grooves.

When the closed barrier 30 is slid to the left in the drawing, the barrier 30 is at first moved forward smoothly along the optical axis by a predetermined amount from the flat state, with the inner surface of the right end of the barrier 30 being kept in contact with a contact portion 16.

Thereafter, the barrier 30 is moved parallel with the front surface of the camera body, keeping a predetermined distance from the initial flat state, and finally stopped at the left end of the camera body 1 so as to completely cover the front surface of the cover 40.

Only after this state, the shutter button 80 can function to allow a photographing operation.

FIG. 3 is an exploded perspective view of a camera according to the first embodiment of the present invention.

Structures of the parts of the camera of the present invention will be described in detail with reference to FIG. 3. The front cover 10 has a plurality of openings.

More specifically, the front cover 10 has an opening 11 for the photographing lens, through which the lens barrel of the photographing lens 60 is inserted so as to be movable along the optical axis. Further, it has an opening 12 for the finder corresponding to the position of the finder 65, an opening 13 for a wall member (described later) to which a wall member 20 is attached, and an opening 14 for the shutter button through which the shutter button 80 is loosely inserted.

The barrier pin traveling groove 15 has two levels of depth, i.e., a shallower portion and a deeper portion. It further includes first and second branched cam means as will be described below. Thus, the barrier pin traveling groove 15 is constituted by four groove portions: grooves 15a, 15b, 15c and 15d.

In a plan view, the deep groove (the longest groove, hereinafter referred to as the parallel groove) 15b extends parallel with the front surface of the cover 10 from an approximately left end of the camera body 1 to a middle portion of the lower interior edge portion 17. The shallow groove (oblique groove) 15a is branched from the parallel groove 15b and extends obliquely backward. The deep groove (oblique groove) 15c is branched from the right end of the parallel groove 15b and extends backward parallel with the oblique groove 15a. The deep groove (oblique groove) 15d forms the distal end portion of the oblique groove 15c.

The deep grooves and the shallow grooves have depths respectively corresponding to the lengths of the long pins 31 and 32 and short pins 33 and 34 of the barrier 30. The short pins 33 and 34 constitute a first sliding projection and the long pins 31 and 32 constitute a second sliding projection, as will be described later.

The contact portion 16 is a slightly projected portion having a trapezoidal cross section. The surface of the contact portion 16 is smoothed.

Like the barrier pin traveling groove 15 formed in the lower interior edge portion 17 as described above, a branched barrier pin traveling groove 15 is also formed in the upper interior edge portion, as indicated by a broken line.

A side wall 10a has two holes h1 and h2. A partition wall 10b is formed in the vertical direction between the upper and lower interior edge portions 17 of the front cover 10 to the left of the center of the camera in the drawing. The partition wall 10b have two holes h3 and h4. Thus, the two walls have the four holes h1 to h4.

The four holes h1, h2, h3 and h4 respectively correspond to attachment holes 24, 25, 22 and 23 for attaching a wall member 20 (described below) to the walls 10a and 10b.

The wall member 20 has the attachment holes 22 to 24 in four corner portions and a boss hole 21 made through a portion near the central thereof.

In the wall member 20, a rectangular region formed in a central portion thereof is thicker than edge portions in which the attachment holes are made.

The wall member 20 is attached from the rear side of the opening 13 for the wall member of the front cover 10, so that the opening 13 is closed by the rectangular region of the wall member 20.

The wall member 20 is fixed to the partition wall 10b and the side wall 10a by screwing fixing screws 72a, 72b, 73a and 73b (see FIG. 4) into the four holes h3, h4, h1 and h2.

The partition wall 10b and the side wall 10a respectively have positioning holes 18 and 19 for determining the position of the cover 40 as will be described later.

The barrier 30 has a shape approximate to the U shape of the recess formed in the front surface of the front cover 10. The length in the longitudinal direction of the barrier 30 plus the cover 40 is the same as the length of the recess.

Further, as shown in FIG. 3, the barrier 30 has four edge portions 30a, 30b, 30c and 30d slightly projecting in the thickness direction of the barrier. Long and short cylindrical barrier pins 33, 34, 31 and 32 are projected from the edge portions in the vertical direction. The barrier pins 33 and 34 constitute a first slide projecting portion and the barrier pins 31 and 32 constitute a second slide projecting portion.

The barrier 30 has the barrier ornament 35 projected forward in a left end portion of the surface.

When the barrier 30 is closed and fitted in the recess of the cover 10, the surface of the camera body 1 is flat as a whole together with the front cover 10 and the cover 40.

The cover 40 has a boss 41 near the center of the rear surface thereof. A bottomed small hole 41a is formed in the center of the boss 41.

Positioning pins 42 and 43 are projected from two end portions on a diagonal of the rear surface of the cover 40, as shown in FIG. 3.

The cover 40 is located at a portion usually held by the right hand of the user, and covers the front right portion of the camera body 1, when the barrier 30 is closed. Therefore, it is preferable that the cross section of the cover 40 taken in the longitudinal direction be substantially trapezoidal, having obtuse corners.

Figure 4:
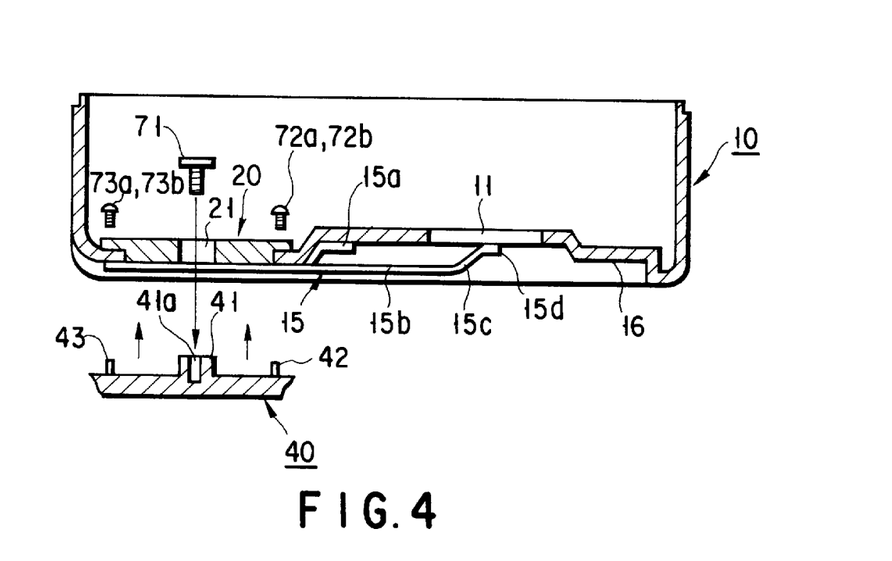
FIG. 4 is a cross-sectional view of a main part of a case relating to the barrier.

FIG. 4 is a cross-sectional view of the front cover 10 having the above barrier 30e.

When the elements described above are assembled, the barrier 30 is inserted in the opening 13 from the inner side of the front cover 10 so as to be in front of the front cover 10, before the rear cover 50 shown in FIGS. 1 and 2 is fitted to the front cover 10.

At this time, the barrier pins 31 and 32 are inserted in the barrier pin traveling grooves 15, so that the barrier 30 is slid to the position in front of the opening 11 for the photographing lens. Further, the barrier pins 33 and 34 are inserted in the barrier pin traveling grooves 15.

Then, the barrier 30 is completely closed. Thereafter, the boss 41 of the cover 40 is inserted in the boss hole 21 of the wall member 20, such that the front cover 20 is sandwiched between the cover 40 and the wall member 20.

At this time, the cover 40 is positioned with respect to the cover 10 by inserting the positioning pins 42 and 43 on the diagonal line of the rear surface of the cover 40 into the positioning holes 18 and 19 formed in the partitioning wall 10b and the side wall 10a of the front cover 10.

A boss screw 71, such as a self-tapping tight screw, is screwed into the bottomed small hole 41a formed in the boss 41 of the cover 40 from the rear side. As a result, the wall member 20 and the cover 40 are fixed to each other with the front cover 10 sandwiched therebetween.

Thus, the front portion of the camera body 1 is assembled.

The barrier pin traveling grooves 15 formed in the front cover 10 will now be described in detail with reference to FIG. 4.

The parallel groove 15b extends, in the horizontal direction, from the neighborhood of the position where the wall member 20 is fixed by the fixing screws 73a and 73b to the position before the center of the opening 11 for the photographing lens. At this position, the deep parallel groove 15b is continuous to the oblique groove 15c of the same depth which forms an angle of about 300 to 45° with the groove 15b, and then to the oblique end groove 15d at the distal end of the same depth.

It is understood from the cross-sectional view of FIG. 4 that the oblique end groove 15d reaches a portion near the center of the opening 11 for the photographing lens in the horizontal direction.

The oblique groove (shallow groove) 15a, branched from the parallel groove 15b, extends substantially parallel with the oblique groove 15c from the neighborhood of the position where the wall member 20 is fixed by the fixing screws 72a and 72b. The length of the oblique groove 15a is substantially the same as that of the oblique groove 15c.

It is also understood from the cross-sectional view of FIG. 4 that the contact portion 16 is slightly projected in the direction along the optical axis.

As described above, when the wall member 20 and the cover 40 are attached to the front cover 10 from the front and the rear sides, gaps are formed between the front cover 10 and the upper and the lower sides of the cover 40. The four edge portions projecting in the thickness direction of the barrier 30 can travel horizontally along the gaps.

At this time, the long pins 31 and 32 and the short pins 33 and 34 are slid in the barrier traveling grooves 15.

Figure 5:
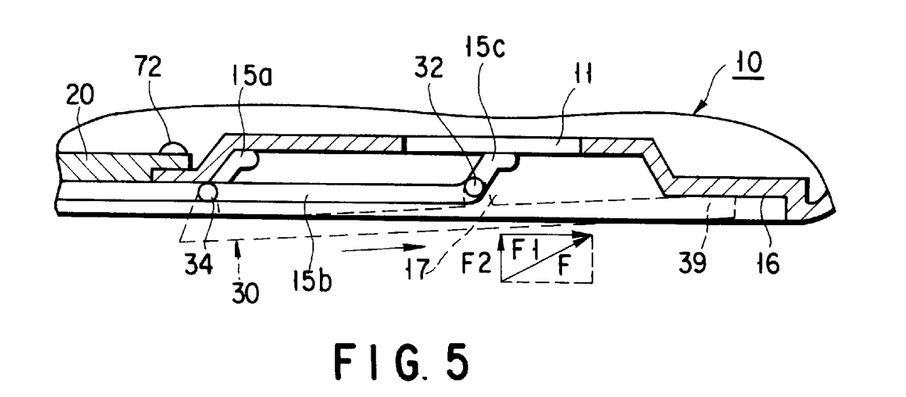
FIG. 5 is an enlarged view of the main part relating to the barrier shown in FIG. 4.

FIG. 5 is an enlarged view of the characteristic part relating to the barrier 30 shown in FIG. 4.

The following is a more detailed explanation of the barrier pin traveling groove 15 and the long pins 31 and 32 and the short pins 33 and 34 of the barrier 30 which travel along the barrier pin traveling grooves 15.

The shallow oblique groove 15a of the barrier pin traveling groove 15 is branched from a middle portion of the longest deep groove 15b extending parallel with the front surface of the camera body 1.

The parallel groove (deep groove) 15b is continuous to the oblique groove 15c of the same depth extending in the direction substantially parallel to the oblique groove 15a. The oblique groove 15c is continuous to the oblique end groove 15d extending substantially parallel to the groove 15b.

The barrier pin (long pin) 32 of the barrier 30 travels straight from the neighborhood of the partition wall in the parallel groove (deep groove) 15b. It changes the direction of travel, proceeds into the oblique groove (deep groove) 15c, and stops in the oblique end groove (deep groove) 15d.

In the same manner, the barrier pin (long pin) 31 is slid along the barrier pin traveling groove 15 provided in the upper edge of the front cover 10.

The barrier pin (short pin) 34 first travels in the parallel groove (deep groove) 15b. After passing the partition wall, it enters into the oblique groove (shallow groove) 15a branched from the parallel groove 15b and stops at the distal end of the groove 15a.

In the same manner, the barrier pin (short pin) 33 is slid along the barrier pin traveling groove 15 provided in the upper edge of the front cover 10.

At this time, as indicated by the broken line in FIG. 5, the surface of the barrier 30 is slightly inclined to the direction substantially parallel to the optical axis of the photographing lens 60 (shown in FIG. 2), with the lowermost end of the barrier 30 being kept in contact with the contact portion 16.

The pins 34 and 32 of the barrier 30 enter the corresponding oblique grooves 15a and 15c. At this time, the contact point in the contact portion 16 serves as a fulcrum for "a single-point support".

As a result, the barrier 30 also moves in the direction substantially parallel to the optical axis of the photographing lens 60 (shown in FIG. 2). At the position where the barrier 30 finally stops, the front surface of the camera body 1 is flat.

In an actual barrier closing operation by a finger of the user, at the same time that lateral force F1 for sliding the barrier in the lateral direction acts, pressing force F2 for pressing the barrier in the direction of the optical axis acts.

The resultant force F at this time causes the barrier 30 to be pressed from the front so as to be integrated with the front surface of the cover 10.

Thus, when the recess of the front cover 10 is completely closed by the barrier 30, the front surface of the camera body 1 becomes flat.

As described above, according to the first embodiment of the present invention, the front cover has a rail structure having shallow and deep grooves continuous at a stepped branch point. Further, the first embodiment is characterized in that the barrier has long pins (inner pins) of such a length as to be prevented from entering the shallow groove at the stepped point and allowed to enter only in the deep groove, and short pins (outer pins) of such a length as to be allowed to enter both the deep and shallow grooves.

In the operation of closing the barrier by the combination of the front cover and the barrier, when the short pin is located at the branch point, force is applied so that the distal end of the barrier elastically functions as a spring, and the short pins smoothly enter the shallow grooves without fail.

As described above, the purpose of providing the distal end of the barrier with the elastic function is to insert the short pins in the shallow grooves without fail. However, the distal end of the barrier does not necessarily have the elastic function, if the dimensions are precise.

In short, the barrier has the combination of two kinds of pins different in length and the rail including two kinds of grooves different in depth. With this combination, it is possible to realize a camera in which the pins can travel smoothly along the grooves of the predetermined depths without being caught by the rails.

Although the above description mainly relates to the process of closing the barrier to be flat, the barrier 30 can be smoothly moved in the opposite direction to an open state. In the opening operation also, the combination of the characteristic barrier 30 and the barrier pin traveling grooves serving as rails and the elastic force of the distal end of the barrier function in the same manner as described above, that is, the correct barrier pins are selected at the branch points, so that the barrier can be moved smoothly in the direction along the optical axis and then travel along the rails smoothly without being caught by the rails.

As described above, according to the first embodiment of the present invention, it is possible to provide a camera having a compact and simple rail mechanism which can realize a successful barrier slide operation by a single smooth operation.

Second Embodiment

A second embodiment of the present invention will now be described.

The second embodiment is different from the first embodiment in the positions of the grooves and the positions of the pins. Since the other portions of the second embodiment are the same as those of the first embodiment, descriptions thereof will be omitted.

Figure 6:
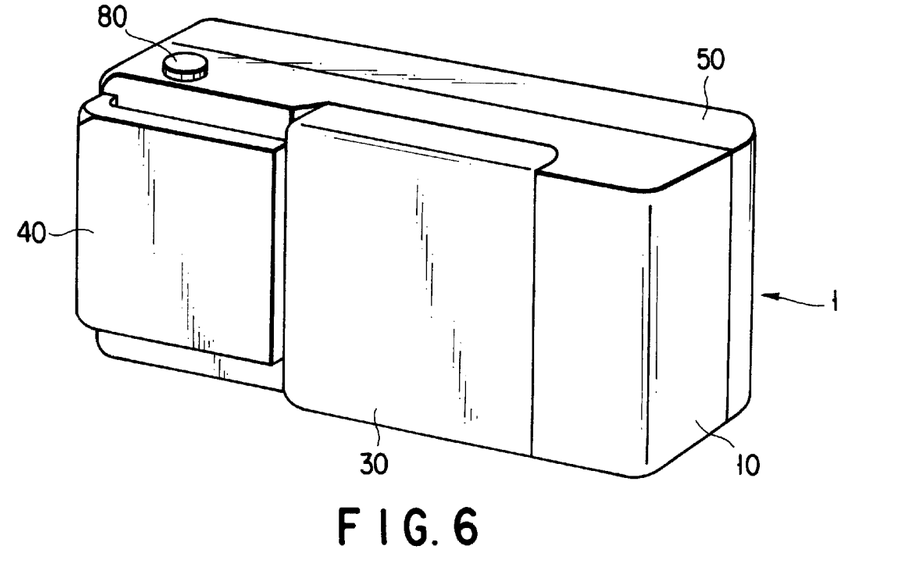
FIG. 6 is a perspective view of a camera according to a second embodiment of the present invention in which the barrier is closed.

FIG. 6 is a perspective view of a camera according to the second embodiment, particularly showing a closed state of a barrier 30 seen obliquely from above the camera.

In the closed state, the camera of the second embodiment has substantially the same elements as those of the first embodiment. However, the second embodiment differs from the first embodiment in the following respects.

First, a barrier 30 movably attached in front of a camera body 1 has no barrier ornament, and the cross section taken along the vertical direction is channel-shaped.

Secondly, the front surface of the camera body 1 is completely flat.

Figure 7:
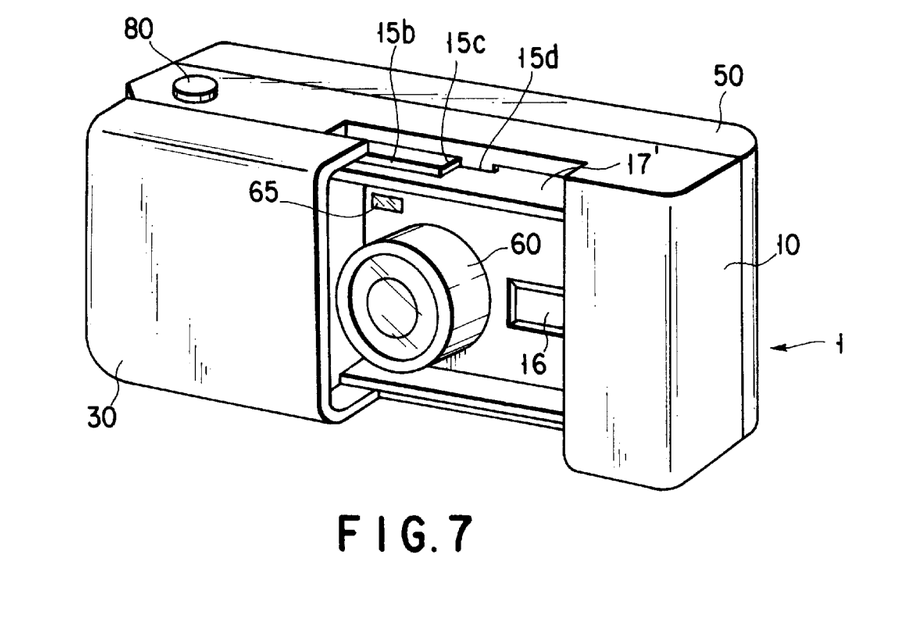
FIG. 7 is a perspective view of a camera according to the second embodiment in which the barrier is opened.

FIG. 7 is a perspective view of the camera shown in FIG. 6 in the case where the barrier is opened.

In this case, when the barrier 30 is slid leftward in the drawing with the upper and the lower sides held between fingers of the user, the power supply (not shown) is turned on. As a result, as shown in FIG. 7, the lens barrel of a photographing lens 60 hidden behind the barrier 30 projects forward along the optical axis and the finder 65 is exposed.

At this time, the barrier 30 is slid along barrier pin traveling grooves 15, which are provided in upper and lower interior edge portions 17' of the front cover 10.

As in the first embodiment, each of the upper and lower barrier pin traveling grooves 15 has a predetermined form and predetermined two levels of depth.

Figure 8:
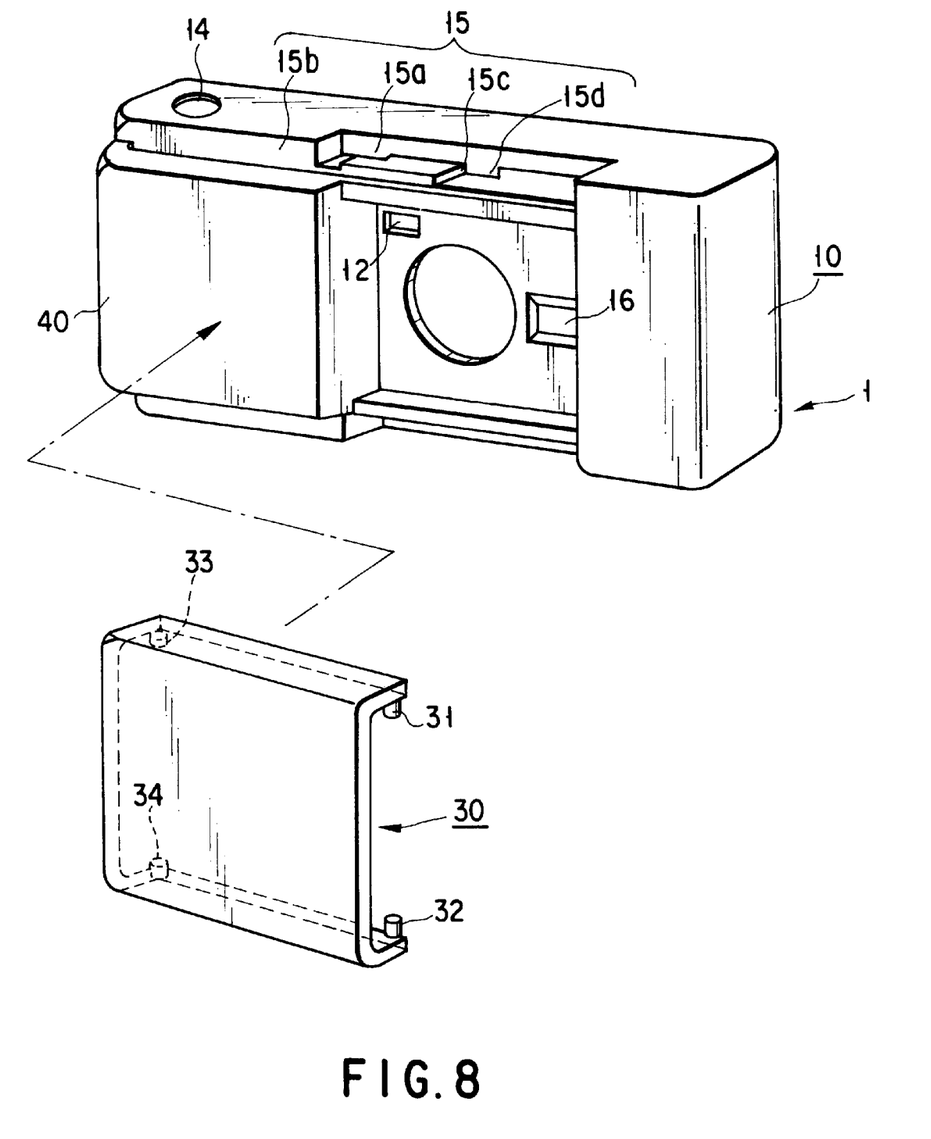
FIG. 8 is an exploded perspective view of a camera according to the second embodiment.

Two pairs of long and short pins are projected from inner portions of the barrier 30 (for details, see FIG. 8). The pins are inserted in and travel along the barrier pin traveling grooves 15.

When the closed barrier 30 is slid to the left, the barrier 30 is at first moved forward smoothly along the optical axis by a predetermined amount from the flat state, with the inner surface of the right end of the barrier 30 being kept in contact with a contact portion 16.

Thereafter, the barrier 30 is moved parallel, keeping a predetermined distance from the initial flat state, and finally stopped at the left end of the camera body 1 so as to completely cover the front surface of the cover 40.

Only after this state, the shutter button 80 can function to allow a photographing operation.

FIG. 8 is an exploded perspective view showing the relationship between the barrier and the front cover 10 of the camera body 1 according to the second embodiment.

Referring to FIG. 8, as in the first embodiment, the front cover 10 has an opening 11 for the photographing lens, an opening 12 for the finder and an opening 14 for the shutter button, through which the lens barrel of the photographing lens 60, the finder 65, and the shutter button 80 are respectively inserted.

The projected contact portion 16 is arranged in the recess portion of the front cover 10 in the same manner as in the first embodiment.

In the second embodiment, the barrier pin traveling grooves 15 are arranged symmetrically in the upper and lower interior edge portions 17'.

The cover 40 is formed integrally with a front left portion of the front cover 10 as one piece.

As shown in FIG. 8, the barrier pin traveling groove 15 comprises an oblique groove (shallow groove) 15a, a parallel groove (deep groove) 15b, an oblique groove (deep groove) 15c, and an oblique groove (deep groove) 15d, as in the first embodiment.

The formal characteristic of the barrier 30 is understandable from FIG. 8. The barrier pin (long pin) 31 and the barrier pin (short pin) 33 are projected downward from the upper edge portion of the barrier 30. The barrier pin (long pin) 32 and the barrier pin (short pin) 34 are projected upward from the lower edge portion of the barrier 30.

When a camera body is assembled, the barrier 30 is attached to the cover 40 so as to overlap it. At this time, the long pins 31 and 32 are first inserted in the barrier traveling grooves 15. Thereafter, the short pins 33 and 34 are inserted therein following the long pins.

As a result, the barrier 30 can be freely slid along the grooves rightward in the drawing.

As described above, the second embodiment of the present invention has a simpler structure and a less number of members as compared to the first embodiment. For example, the positioning holes, the wall member, the boss hole, the attachment holes, the barrier ornament, etc., are not required in the second embodiment.

Further, the same effect and advantage as those of the first embodiment can be obtained by the barrier traveling grooves 15 formed in the upper and lower edge portions 17' of the front cover 10 and the barrier having a channel-shaped cross section along the vertical direction.

Furthermore, the barrier and the cover can be worked easily due to the simple shape, and assembled easily and firmly by utilizing the elastic force of the material of the barrier.

If the barrier 30 is opened and closed reliably and smoothly without using the contact portion 16 in the front cover 10, the contact portion 16 need not be formed.

Thus, according to the second embodiment, it is possible to provide a camera comprising a barrier which has a simple and compact rail structure.

Other Modifications

The limitations of the camera relating to "left and right", "in and out", and "upper and lower" are not necessarily restricted to those of the embodiments described above.

Further, the present invention is applicable not only to a compact camera but to any type of camera.

In the above description, the barrier pin grooves, the shallow grooves and the deep grooves are not necessarily bottomed grooves. It is easily conceivable that they may be replaced by cams or cam means with which a projecting member can be engaged.

As has been described above in detail, the present invention can provide a camera having a compact and simple rail mechanism which can realize a successful barrier slide operation by a single smooth operation.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera comprising:
   a camera body including a photographing lens;
   a barrier supported on the camera body so as to be movable between a cover position covering the photographing lens and a retreat position retreated from the cover position in a first direction substantially parallel to an optical axis of the photographing lens and a second direction substantially perpendicular to the first direction; and
   a rail mechanism for guiding relative movement between the camera body and the barrier in the first and the second directions of the barrier,
   said rail mechanism comprising:
      a first slide projection having a predetermined projecting length for guiding movement of the barrier;
      a second slide projection, having a projecting length longer than the first slide projection, for guiding movement of the barrier;
      first cam means, slidably engaged with the first and the second slide projections, for guiding movement of the barrier in the second direction; and
      second cam means, branched from the first cam means and slidably engaged with only the first slide projection, for guiding movement of the barrier in the first direction,
      wherein the first and the second cam means respectively have deep and shallow grooves, the deep groove of the first cam means being deeper than the shallow groove of the second cam means.

2. A camera according to claim 1, wherein the first and second cam means have engagement prohibiting means for prohibiting the second slide projection from being engaged with the shallow groove of the second cam means, when the barrier is moved.

3. A camera according to claim 2, wherein the engagement prohibiting means has a step at a boundary between the first and the second cam means, where depth is changed between the deep groove of the first cam means and the shallow groove of the second cam means, thereby preventing the second slide projection from entering the shallow groove of the second cam means out of the deep groove of the first cam means, when the barrier is moved.

4. A camera according to claim 1, wherein the first and the second slide projections have cylindrical shapes which can be slidably engaged with the deep groove and the shallow groove of the first and the second cam means.

5. A camera according to claim 1, wherein said rail mechanism comprises a pair of the first slide projections, a pair of the second slide projections, a pair of the first cam means and a pair of the second cam means.

6. A camera comprising:
   a camera body including a photographing lens and a rail formed of a shallow groove and a deep groove connected to each other;
   a barrier supported on the camera body so as to be movable along the rail between a cover position covering the photographing lens and a retreat position retreated from the cover position;
   a long projection provided on the barrier so as to be slidable along the rail and engageable with only the deep groove;
   a short projection provided on the barrier so as to be engageable with both the deep groove and the shallow groove; and
   urging means, elastically deformed when one of both ends of the barrier along a direction of movement of the barrier is brought into contact with the camera body, for urging the barrier so that the short projection can be inserted and removed from the shallow groove.

7. A camera comprising:
   a camera body including a photographing lens;
   a barrier supported on the camera body so as to be movable between a cover position covering the photographing lens and a retreat position retreated from the cover position in a first direction substantially parallel to an optical axis of the photographing lens and a second direction substantially perpendicular to the first direction;
   a first slide projection having a short length formed on the barrier;
   a second slide projection having a long length formed on the barrier; and
   a grooved rail for guiding movement of the barrier,
   said grooved rail comprising:
      a grooved common rail portion formed in the camera body, engaged in common with the first and the second slide projections, when the barrier is moved;
      a first grooved rail portion branched from a middle portion of the grooved common rail portion and engaged with only the first slide projection, said first grooved rail portion being shallower than the grooved common rail portion; and
      a second grooved rail portion continuous to the grooved common rail portion in a region where only the second slide projection can move, and engaged with the second slide projection.

8. A camera according to claim 7, wherein an inclination of the barrier with the optical axis of the photographing lens is determined to be an angle by the second slide projection and an end of the barrier along an axis of movement of the barrier which is brought into contact with the camera body while the barrier is moving.

9. A camera comprising:

a camera body including a photographing lens;

a movable barrier movable between a first position covering a front of the photographing lens, where the movable barrier and a front surface of the camera body are substantially on a same plane, and a second position retreated from the front of the photographing lens and projected from the front surface of the camera body to expose the photographing lens;

a long pin and a short pin, arranged in line with an axis of movement of the movable barrier and crossing an optical axis of the photographing lens, the long pin being closer to the photographing lens than the short pin;

a first cam groove, engaged with the long pin and bent so that the movable barrier comes closer to the photographing lens via the long pin, when the movable barrier moves from the second position to the first position;

a contact portion brought into contact with a distal end portion of the movable barrier when the movable barrier approaches the first position along the first cam groove; and a second cam groove, shallower than the first cam groove and branched from the first cam groove, for guiding the short pin together with the long pin engaged with the first cam groove, so that the movable barrier can be positioned at the first position.

10. A camera comprising:

a camera body including a photographing lens;

a movable barrier movable between a first position covering a front of the photographing lens, where the movable barrier and a front surface of the camera body form a substantially flat surface, and a second position retreated from the front of the photographing lens and projected from the front surface of the camera body to expose the photographing lens;

a guide surface for guiding side surfaces of the movable barrier;

a cam groove bent so that the movable barrier is movable with respect to the guide surface between the first position and the second position;

a long pin and a short pin, engaged with the cam groove and arranged in line with an axis of movement of the movable barrier, the long pin being closer to the photographing lens in the axis of movement of the movable barrier; and a contact portion brought into contact with a distal end portion of the movable barrier when the movable barrier moves from the second position to the first position;

wherein the cam groove comprises:

a first groove portion engaged with the long pin, when the movable barrier moves from the second position to the first position; and a second groove portion, having a depth smaller than a length of the long pin and branched from the first groove portion, provided to be engaged with the short pin when the movable barrier is brought into contact with the contact portion.

11. A camera comprising:

a barrier movable between a cover position where the barrier covers a photographing lens and a retreat position where the barrier is retreated away from the photographing lens, the barrier having a first cam follower and a second cam follower; and a camera body including a first cam groove arranged for allowing the first cam follower and the second cam follower to be slidably engaged with the first cam groove, and a second cam groove arranged for allowing the second cam follower to be slidably engaged with the second cam groove, the second cam groove branching off from the first cam groove, and the second cam groove having non-engaging means for prohibiting the first cam follower from being engaged with the non-engaging means, wherein the second cam groove includes a shallow groove, which shallow groove is shallower than the first cam groove, and wherein the shallow groove comprises said non-engaging means of the second cam groove.

12. A camera according to claim 11, wherein the first and second cam grooves enable the barrier to be moved to the cover position in a direction parallel to an optical axial direction of the photographing lens.

* * * * *

UNITED STATES PATENT AND TRADEMARK OFFICE
CERTIFICATE OF CORRECTION

PATENT NO.     : 6,347,893 B1
DATED          : February 19, 2002
INVENTOR(S)    : Junji Shiono et al.

It is certified that error appears in the above-identified patent and that said Letters Patent is hereby corrected as shown below:

Drawings,
The sheet of drawing consisting of figure 8, should be deleted to appear as per attached figure 8.

Signed and Sealed this

First Day of October, 2002

*Attest:*

*Attesting Officer*

JAMES E. ROGAN
*Director of the United States Patent and Trademark Office*

FIG. 8